Jan. 11, 1938.  C. S. BRAGG  2,104,731

CLUTCH CONTROLLING MECHANISM

Filed April 17, 1935

INVENTOR.
CALEB S. BRAGG
BY
ATTORNEY

Patented Jan. 11, 1938

2,104,731

UNITED STATES PATENT OFFICE 2,104,731

CLUTCH CONTROLLING MECHANISM

Caleb S. Bragg, Palm Beach, Fla., assignor to Bragg-Kliesrath Corporation, South Bend, Ind., a corporation of New York Application April 17, 1935, Serial No. 16,748

10 Claims. (Cl. 192—.01)

This invention relates to power means for operating the clutch of an automotive vehicle.

The principal object of the invention is to provide a clutch operator that is automatically operable with an operation of the accelerator, thus relieving the driver of all conscious control of the clutch.

A further object is to provide a power mechanism operable to simulate a conventional manual operation of the clutch, whereby the same is engaged relatively rapidly until the plates thereof contact, the engagement being then automatically retarded to cushion the remainder of the engaging movement and thus insure a smooth start of the vehicle. In the accomplishment of the two stages of clutch engagement there are provided two pressure differential operated motors, both controlled by an accelerator operated valve and each operatively connected to the clutch by means so constructed and arranged and interconnected one with another as to insure said mode of engagement. To this end the two motors may be telescoped one within the other, or they may be separated and jointly connected with the clutch by a floating lever mechanism.

A further object of the invention is to provide power means operable both to disengage the clutch and to aid in the engagement thereof, said means being controlled by an accelerator operated valve operable when the accelerator is released to effect a disengagement of the clutch and when the accelerator is depressed to aid in the engagement of the clutch.

Figure 1:
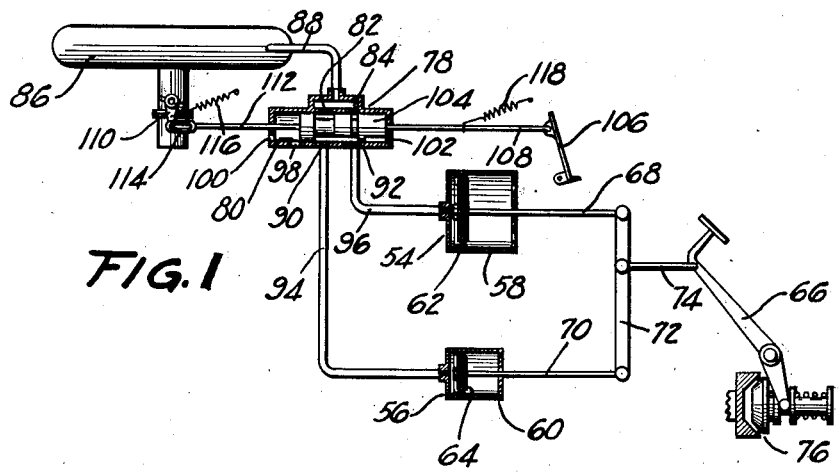
Figure 2:
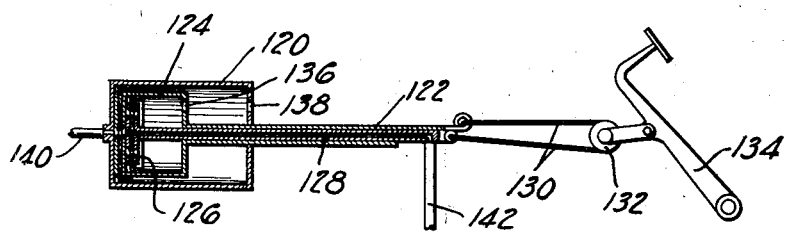

Other objects of the invention and desirable details of construction and combinations of parts will become apparent from a detailed description of certain embodiments of the invention, described in detail in the following specification taken in conjunction with the accompanying drawing illustrating said embodiments, in which:

Figure 1 is a diagrammatic view disclosing one embodiment of multi-motored power means for controlling the operation of the clutch; and Figure 2 discloses a second embodiment of multi-motored clutch controlling power means.

Referring now to the embodiment of my invention disclosed in Figure 1 there is provided clutch operating power means comprising juxtaposed pressure differential operated motors 54 and 56, the motor 54 preferably being of larger bore and stroke than the motor 56. The motors comprise cylinders 58 and 60, fixed to the chassis and housing, respectively, pistons 62 and 64. The latter are preferably connected to a clutch pedal 66 by a floating linkage including rods 68 and 70 pivotally connected at their ends to a link 72, the latter being pivotally connected intermediate its ends to the clutch pedal by a link 74. The pedal 66 actuates a conventional clutch 76 in the usual manner.

The motors are controlled by a valve 78 comprising a casing 80 ported at 82 and 84 to interconnect the casing with a manifold 86 by a conduit 88, ported at 90 and 92 to receive conduits 94 and 96 connected respectively with the cylinders 60 and 58, and ported at 98, 100, and 102 to provide vents to the atmosphere. A recessed valve member 104, reciprocable within said casing, is connected to an accelerator 106 by a link 108 and to a throttle valve 110 by a link 112 and a lost motion connection 114. Springs 116 and 118 serve, respectively, to bias the throttle and accelerator to their off positions.

Describing the operation of the aforementioned mechanism, upon releasing the accelerator, the throttle is first closed; further release movement of the accelerator serves to position the valve plunger 104, as disclosed in Figure 1 to successively connect the manifold with the cylinders 58 and 60. The resulting evacuation of the cylinders serves to move the pistons 62 and 64 to the position disclosed in the figure, thus disengaging the clutch.

Reversing the operation, depression of the accelerator serves to successively deenergize the motors and open the throttle, all adjustable parts, including the relative size of the conduits, bore and stroke of the motors, moment arms and fulcrums of the linkage mechanism, being so determined as to effect at least two stages of movement of the driven clutch plate, said stages comprising a relatively rapid movement of the plate up to the aforementioned point of engagement and thereafter a relatively slow movement of the plate to cushion the engagement and insure a smooth operation of the clutch. It will also be noted, as referred to above, that the motors may be successively energized and deenergized, this by virtue of the arrangement of the ports in the valve casing. Thus, with a deenergization of the motor 54, the engagement of the clutch is stopped short of a complete engagement, the driving clutch plate being positioned just out of contact with the driven plate. Further depression of the accelerator serves to actuate the valve to deenergize the motor 54 and complete the engagement of the clutch.

There is disclosed in Figure 2 a modified form of multi-motored clutch operating power means. A double-ended cylinder 120 is bored at one end to receive a hollow connecting rod 122 of a pistonlike double-ended cylinder member 124. The latter houses a reciprocable piston 126 provided with a hollow piston rod 128 telescoping within the aforementioned rod 122. A flexible member 130, connected at its ends to the rods 122 and 128 respectively, is passed over a shiv or other direction-changing member 132 connected to a clutch pedal 134. Cylinders 120 and 124 are provided with registering vents 136 and 138 respectively, and the construction is completed by conduits 140 and 142 connected respectively to the cylinder 120 and rod 128 and to an accelerator operated valve (not shown) identical with that disclosed in Figure 1.

Describing the operation of the aforementioned modification, upon releasing the accelerator, the throttle is first closed and the cylinders 120 and 124 are then successively evacuated to effect the two-stage clutch disengagement, simulating the operation of the modification of Figure 1: likewise, upon depressing the accelerator, the motors 120 and 124 are successively deenergized and the throttle then opened, the operation providing, as with the modification of Figure 1, a two-stage variable engagement of the clutch. The several different rates of clutch movement are obtained by virtue of the construction and arrangement of the motor parts, and particularly by virtue of the pulley arrangement of the connection between the motors and the clutch.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In an automotive vehicle provided with a clutch and an accelerator, power means for operating the clutch to effect a disengagement and a multistage engagement thereof, said power means comprising a plurality of pressure differential operated motors, means interconnecting said motors and clutch, and accelerator operated valve means for controlling the operation of said motors.

2. In an automotive vehicle provided with a clutch and an accelerator, power means for operating the clutch comprising a plurality of motors operatively connected with the clutch, and a single valve mechanism for controlling the operation of said motors to effect a controlled disengagement of the clutch and a controlled engagement thereof.

3. In an automotive vehicle provided with a clutch and an accelerator, power means for operating the clutch comprising a plurality of successively operable motors operatively connected with the clutch, and an accelerator operated valve mechanism for controlling the operation of said motors to effect a disengagement of the clutch and a controlled engagement thereof.

4. In an automotive vehicle provided with a clutch and an accelerator, power means for operating the clutch comprising a plurality of motors nested one within another, and a single valve means for controlling the operation of said motors.

5. In an automotive vehicle provided with a clutch, power means for operating the clutch comprising a fixed cylinder member, a combined cylinder and piston member slidably mounted within said fixed cylinder member and operatively connected to the clutch, and a piston member slidably mounted within said second-mentioned cylinder member, said latter piston member also being operatively connected with the clutch.

6. In an automotive vehicle provided with a clutch and an accelerator, power means for operating the clutch comprising a plurality of successively operable motors nested one within another, and an accelerator operated valve means for controlling the operation of said motors.

7. In an automotive vehicle provided with a clutch, power means for operating the clutch comprising a plurality of successively operable pressure differential operated means, and a double three-way valve means for controlling the operation of said power means.

8. In an automotive vehicle provided with a clutch, power means for operating the clutch comprising a plurality of successively movable pistons, means connecting said pistons with the clutch, and valve means for controlling the operation of said power means.

9. In an automotive vehicle provided with a clutch, power means for operating the clutch comprising two juxtaposed motors including pistons, lever means interconnecting said pistons and clutch, and valve means for controlling the operation of said motors.

10. In an automotive vehicle provided with a clutch and an accelerator, power means for operating the clutch comprising two juxtaposed motors including pistons, a floating lever means interconnecting said pistons and clutch, and valve means for controlling the operation of said motors.

CALEB S. BRAGG.